United States Patent
Fahn et al.

(10) Patent No.: US 8,694,783 B2
(45) Date of Patent: Apr. 8, 2014

(54) LIGHTWEIGHT SECURE AUTHENTICATION CHANNEL

(75) Inventors: Paul Fahn, Sunnyvale, CA (US); Sanjeev Verma, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1164 days.

(21) Appl. No.: 11/868,411

(22) Filed: Oct. 5, 2007

(65) Prior Publication Data
US 2008/0240433 A1  Oct. 2, 2008

Related U.S. Application Data

(60) Provisional application No. 60/881,880, filed on Jan. 22, 2007.

(51) Int. Cl.
*H04L 9/32* (2006.01)

(52) U.S. Cl.
USPC .......................................................... 713/169

(58) Field of Classification Search
USPC .................... 713/150, 168–171; 308/284; 709/225–226, 229
See application file for complete search history.

(56) References Cited

U.S. PATENT DOCUMENTS

| | | | |
|---|---|---|---|
| 6,542,610 B2 * | 4/2003 | Traw et al. ..................... | 380/262 |
| 6,799,270 B1 * | 9/2004 | Bull et al. ..................... | 713/153 |
| 7,231,516 B1 * | 6/2007 | Sparrell et al. ................ | 713/156 |
| 7,260,224 B1 * | 8/2007 | Ingle et al. .................... | 380/279 |
| 7,797,532 B2 * | 9/2010 | Miura et al. ................... | 713/156 |
| 2003/0014652 A1 * | 1/2003 | Nakayama ..................... | 713/193 |
| 2006/0161771 A1 * | 7/2006 | Zhang ............................ | 713/168 |
| 2006/0190724 A1 * | 8/2006 | Adams et al. ................. | 713/166 |
| 2007/0028099 A1 * | 2/2007 | Entin et al. .................... | 713/163 |
| 2007/0083759 A1 * | 4/2007 | Drew et al. .................... | 713/168 |
| 2007/0174612 A1 * | 7/2007 | Urban et al. ................... | 713/168 |
| 2007/0192480 A1 * | 8/2007 | Han et al. ...................... | 709/224 |
| 2007/0214357 A1 * | 9/2007 | Baldus et al. ................. | 713/157 |
| 2008/0005564 A1 * | 1/2008 | Agarwal ........................ | 713/171 |
| 2010/0061557 A1 * | 3/2010 | Youn et al. .................... | 380/279 |
| 2010/0100740 A1 * | 4/2010 | Ho ................................ | 713/171 |

OTHER PUBLICATIONS

Menezes, A et al., Handbook of applied cryptography, 1997, CRC Press LLC.*
Kaufman et al., Network Security: Private Communication in a Public World, Second Edition, Prentice Hall.*
Wikipedia, "Transport Layer Security", http://en.wikipedia.org/wiki/Transport_Layer_Security, Downloaded Mar. 18, 2013, 25 pages, Wikipedia Foundation, Inc., USA.
Wikipedia, "Kerberos (protocol)", http://en.wikipedia.org/wiki/Kerberos_(protocol), Downloaded Mar. 18, 2013, 6 pages, Wikipedia Foundation, Inc., USA.

* cited by examiner

*Primary Examiner* — Kambiz Zand
*Assistant Examiner* — Jing Sims
(74) *Attorney, Agent, or Firm* — Kenneth L. Sherman, Esq.; Michael Zarrabian, Esq.; Sherman & Zarrabian LLP

(57) ABSTRACT

A secure authentication channel (SAC) between two nodes in a communication network is created by the nodes themselves using mutual authentication. The network has two nodes, a coordinating entity, two PKI-based SACs, and one non-PKI SAC which is created by the two nodes and is for use by the nodes. The coordinating entity generates a master key which is transmitted to two nodes via a PKI-based SAC established between the coordinating entity and each of the two nodes. One node uses the master key to generate a first random number and the second node uses the key to generate a second random number. The second node also has an encrypted third random number. The network also has a third SAC, which is not solely based on PKI, between the first node and the second node and is created when the two nodes have authenticated each other. The mutual authentication process occurs without the intervention of the coordinating entity.

17 Claims, 5 Drawing Sheets

LIGHTWEIGHT SECURE AUTHENTICATION CHANNEL

CROSS-REFERENCE TO RELATED APPLICATIONS

This application claims the benefit under 35 U.S.C. §119 of provisional patent application No. 60/881,880, titled "Lightweight Secure Authentication Channel Establishment Using Shared Secret With PKI-Based Distribution," filed Jan. 22, 2007, which is incorporated by reference in its entirety and for all purposes.

BACKGROUND OF THE INVENTION

1. Field of the Invention

The present invention relates to computer network security. More specifically, it relates to establishing secure channels between entities in a data communications network.

2. Description of the Related Art

One of the goals of establishing a secure authentication channel or "SAC" between nodes is to prevent tampering or corrupting of data being transmitted between the nodes. For example, sensitive data may be encrypted to prevent unauthorized parties from reading the data; the bytes comprising the data are scrambled, thereby protecting the content from being read. However, the scrambled data may still be tampered with or altered, for example, bits may be changed randomly, thereby preventing an authorized party from accurately decrypting the data. In this scenario, although a disruptive party may not be able to read the contents of the data, it is able to at least prevent the authorized recipient from obtaining an accurate rendering of the content (or any rendering) when decrypting the content, essentially sabotaging or undermining the relationship between the sender and the recipient. A SAC denies the disruptive party access to the encrypted content and thereby protects it from tampering. One of the applications of a SAC is in the context of digital rights management and transmission of, for example, copyright protected data, such as movies, music, various audio/visual content, only subscription-only content (e.g., medical data, financial data, and so on).

Methods of establishing a Secure Authentication Channel (SAC) between two entities may be separated into two categories: (a) those using common public key based infrastructure (PKI) cryptography, and (b) those that use shared secret key cryptography (which requires a shared secret between parties establishing a SAC). PKI-based methods are more scalable and may be more secure than the shared secret approach. However, they require significant computational resources. Secret key methods are efficient, but are often not secure (depending on how the shared secret is generated and distributed to all parties) and may not be scalable.

Transport Layer Security (TLS) is a well-known method for establishing a SAC using a PKI-based mechanism. TLS is cryptographically intensive primarily because it uses public key cryptography. Trust between entities lasts only as long as a session is alive. This is undesirable in certain environments, such as in a home network, which may require a constant or ongoing session and involve a number of low-powered devices having limited memory and computing power. Public key based mechanisms are scalable since there is no need to pre-configure communicating entities using shared secrets. However, as noted, they are costly in terms of processing and complexity due to PKI-based operations.

Shared secret methods of establishing a SAC consist of using shared secret key mechanism, which are, in contrast to PKI, simple to implement. However, these methods may have scalability issues, since, in order to allow any two communicating entities to communicate privately, every communicating entity needs to be configured with a shared secret. Thus, if there are n communicating entities in the network, then each entity needs to store or know (n−1) keys, one for each other entity. If a new entity is added, then n new keys need to be generated, so that the new entity may have a shared secret with each of the other n entities. This is not clearly scalable in a large network.

One approach to facilitate management of shared keys is to use a central trusted entity, often referred to as a Key Distribution Center (KDC). The KDC shares a shared secret key with each of the communicating entities. If a new entity is installed, then only that entity and the KDC need to be configured with a new secret key. In some cases the KDC facilitates a SAC by sending a shared secret to the two entities, encrypting the shared secret using the two entities secret keys. Kerberos is another example of a shared key based service that uses the concept of KDC to provide authentication and private communications in the network. In Kerberos, the KDC communicates with only one of the nodes instead of with both. The KDC sends the key and a ticket (containing an encrypted key) to one of the nodes. The other node recovers the encrypted key from the ticket using the pre-shared secret.

SUMMARY OF THE INVENTION

One embodiment of the present invention is a method of creating a secure authentication channel (SAC) in a communication network. A first random number is encrypted using a master key at node A, thereby creating an encrypted first random number. The random number is decrypted at node B using the master key, whereby the first random number is revealed. At node B, a second random number and the first random number are encrypted using the master key, thereby creating an encrypted third random number. At node A, the encrypted third random number is decrypted using the master key, whereby the first random number and the second random number are revealed. At node A, the (revealed) first random number is compared to a stored copy of the first random number (generated at the first step). If the numbers match, the second random number is encrypted using the master key at node A, thereby obtaining an encrypted second random number. At node B the encrypted second random number is decrypted and is compared to a stored copy of the second random number. If there is a match, then creating a SAC between node A and node B.

In other embodiments, a SAC is created between node A and a coordinating entity using Public Key Infrastructure (PKI). Similarly, a SAC is created between node B and the coordinating entity using PKI. The coordinating entity generates a master key specifically for nodes A and B and transmits the key to the nodes using the PKI-based SACs.

Another embodiment of the present invention is a network having at least two nodes, a coordinating entity, two PKI-based SACs, and one non-PKI SAC created by the two nodes and for use by the nodes. The coordinating entity generates a master key which is transmitted to two nodes via a PKI-based SAC established between the coordinating entity and each of the two nodes. One node uses the master key to generate a first random number and the second node uses the key to generate a second random number. The second node also has an encrypted third random number. The network also has a third SAC, which is not solely based on PKI, between the first node and the second node and is created when the two nodes have authenticated each other. In other embodiments the first node has a comparison software module for comparing a stored copy of the first random number with a decrypted first random number. Similarly, the second node has a comparison software module for comparing a stored copy of the second random number with a decrypted second random number.

BRIEF DESCRIPTION OF THE DRAWINGS

References are made to the accompanying drawings, which form a part of the description and in which are shown, by way of illustration, particular embodiments.

DETAILED DESCRIPTION OF THE INVENTION

Figure 1:
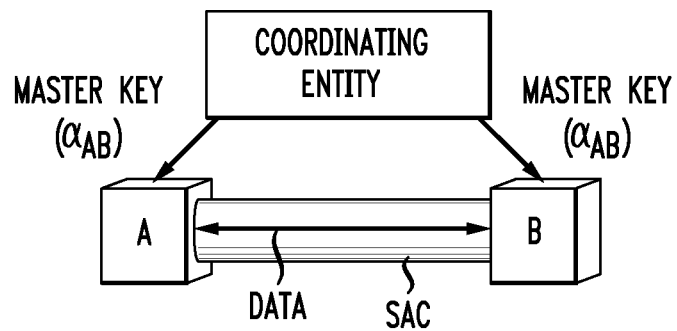
FIG. 1 is a network diagram showing relationships between a coordinator and nodes A and B.

In this application, numerous specific details are set forth in order to provide a thorough understanding of the present invention. It will be obvious, however, to one skilled in the art, that the present invention may be practiced without some or all of these specific details. In other instances, well known process steps have not been described in detail in order to not obscure embodiments of the present invention.

Methods and systems for establishing a secure authentication channel (SAC) to enable secure trusted communication between two or more entities are described in the various figures. In one embodiment, a SAC is used to send protected data from one entity (A) to another entity (B). In the present invention, there is a Coordinating Entity that initiates and manages SAC establishment between entities A and B, as well as other nodes and entities in the same network. In the present invention, it is assumed that there is a common public key infrastructure (PKI) that is shared by entities A and B and that this common PKI may be used for secure and trusted data distribution between the Coordinating Entity (hereinafter, CE or coordinator) and the nodes wanting to establish a SAC among them.

In the present invention, a shared secret key mechanism is used to establish trust relationships between communicating entities by taking advantage PKI-based security infrastructure. In the present invention, a hybrid between PKI and shared secret key approaches is used to establish a SAC. This involves using a common PKI-based trust architecture which enables secure messaging over PKI-based trusted communication interfaces to establish a shared secret between the communicating entities. This avoids the complicated and cumbersome PKI-based approach between communicating entities, while leveraging the security and scalability of PKI.

As described above, a coordinator coordinates the establishment of a SAC between nodes A and B. The coordinator may use the secure communication interfaces to communicate with nodes A and B, and other nodes in the network.

One embodiment of the present invention utilizes existing secure communication interfaces (e.g., PKI between node A and CE and node B and CE) to establish shared secrets between nodes, and such shared secrets are then used to implement a SAC, thereby avoiding cryptographically intensive PKI operations to establish a SAC.

In the SAC establishing mechanism of the present invention, the coordinator is involved in establishing a shared secret between nodes A and B. In one embodiment, the SAC establishment method of the present invention uses PKI-based secure channels to provide the underlying trust infrastructure or architecture for identity authentication. The content transfer architecture of the present invention uses PKI-based authentication to authenticate the identities of the nodes or entities.

As noted, one embodiment uses PKI-based trust infrastructure to facilitate authentication for establishing a SAC, orchestrated by the coordinator that communicates with the entities requesting that a SAC be established. In one embodiment there are two such parties, nodes A and B. The coordinator or CE passes to each node certain information (such as a transfer session ID and the identity of the other party) required in setting up the SAC between nodes A and B. The CE also sends a Master Key to the nodes, which will allow them to establish a SAC in an efficient and secure manner. These processes and those that follow are described in greater detail with respect to the figures.

In one embodiment, a Master Key and two random values or nonces: $N_a$ and $N_b$ are used to establish the SAC, authenticate the parties to each other and generate session keys to protect the data being transferred. Nodes A and B get a "transfer session id" and Master Key from the coordinator; the Master Key is encrypted while being sent from coordinator to Node A and Node B. Node A generates and sends nonce $N_a$, encrypted using the Master Key, and a transfer session identifier to node B. Node B uses the transfer session ID to identify the corresponding Master Key (it may have many) and decrypts nonce $N_a$ using the Master Key. Node B then sends nonce $N_a$ and a new nonce (generated by node B) $N_b$, encrypted using the Master Key along with the transfer session ID to node A. Node A, upon receiving $N_a$, authenticates node B by comparing the value of $N_a$ that it received with the value of $N_a$ that it previously sent. In one embodiment, this may be performed by a comparison software module in node A or by code integrated in the operating or application software of node A. If they match, authentication has been proven and node B is successfully authenticated to node A. Node A now decrypts nonce $N_b$ using the Master Key identified through the transfer session ID and sends it, encrypted with the Master Key, to node B, which, upon receiving the nonce $N_b$ authenticates node A by comparing the value of $N_b$ that it received to the value of $N_b$ that it previously sent. Similar to node A, this may be performed by a comparison software module in node B or by code integrated in the operating or application software of node B. If the values are equal, node A is successfully authenticated to node B. Both nodes now calculate one or more session keys using the exchanged nonces and the shared Master Key using a key derivation function. The data are now protected using session keys by node A, transported over the secure channel, which may be any suitable physical connection, and then decrypted with the session keys by node B. These processes and others are described in detail below.

FIG. 1 is a network diagram showing relationships between a coordinator and nodes A and B. Network 100 has a CE 102 and two nodes A 104 and B 106. A SAC 108 is established to transmit data 110. A Master Key (MK), 112 is transmitted from CE 102 to A 104 and from CE 102 to B 106. Creation of Master Key 112 and SAC 108 are described in the figures below. Embodiments of the present invention may be utilized in a wide variety of network contexts and environments, ranging from home networks, hospital networks, corporations, and the like.

Figure 2:
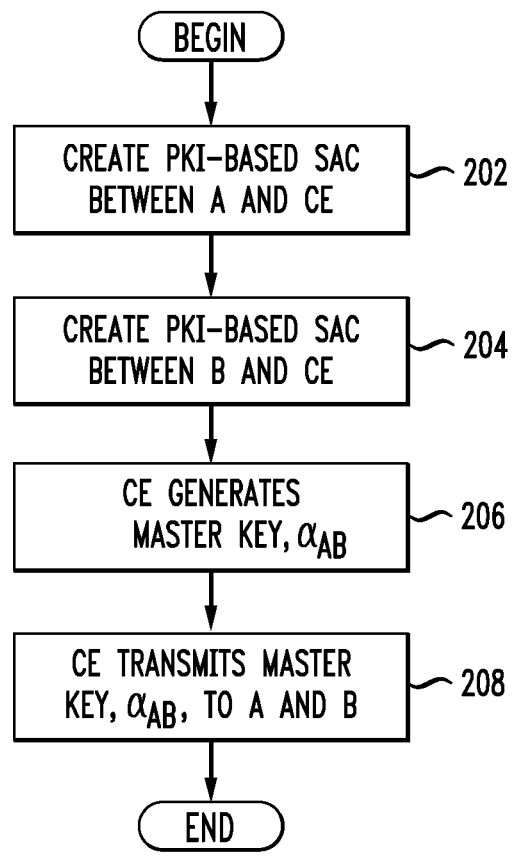
FIG. 2 is a flow diagram of one example of a process of creating and securely transmitting a master key from a coordinating entity to nodes A and B.

FIG. 2 is a flow diagram of one example of a process of creating and securely transmitting MK 112 from CE 102 to nodes A and B. Steps of the methods shown and described need not be performed (and in some implementations are not performed) in the order indicated. Some implementations of these methods may include more or fewer steps than those described. At step 202 a public key infrastructure-based (PKI-based) SAC is created between the CE and node A. At step 204 a PKI-based SAC is created between the CE and node B. This may be done in a manner similar to that of step 202. In another embodiment, a SAC may be created using another method, such as one utilizing a shared secret. At step 206 the CE generates a Master Key (AB) or $MK_{AB}$ (e.g., a random or quasi-random number). At step 208 the CE securely transmits $MK_{AB}$ and other data such as a transfer session ID to nodes A and B using the PKI-based SAC created at step 202.

Figure 3:
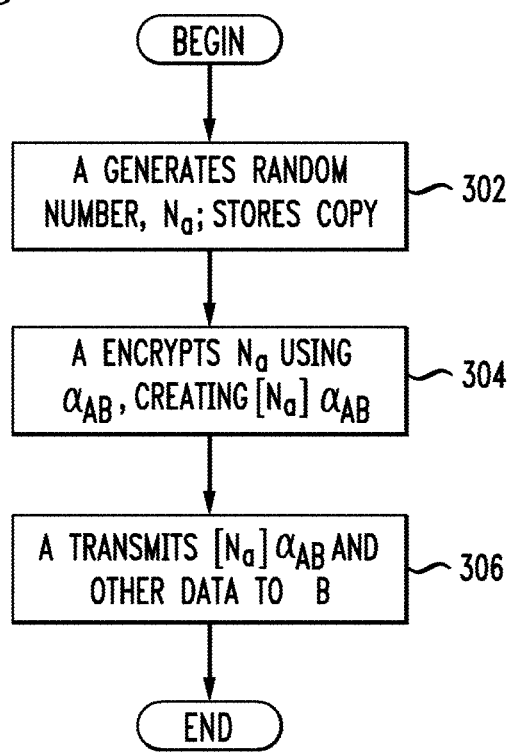
FIG. 3 is a flow diagram of a process of one node, for example, node A, creating and transmitting an encrypted random number to another node, such as node B.

FIG. 3 is a flow diagram of a process of one node, for example, node A, creating and transmitting an encrypted random number to another node, such as node B. At step 302, node A generates a random number or nonce, $N_a$. In other embodiments, the number may not be a pure random number, but a quasi-random number. Once $N_a$ is generated, a copy of it is stored in memory at node A. At step 304, node A encrypts $N_a$ using $MK_{AB}$. Any appropriate encryption method may be used to encrypt $N_a$. In one embodiment, the AES encryption scheme is used. Once encrypted using master key, MK, which is only known to the coordinator and nodes A and B, the encrypted value, $MK_{AB}(N_a)$ is transmitted to node B at step 306. Other data are also transmitted to node B, such as transfer session id and information identifying the data sent over the new SAC.

Figure 4:
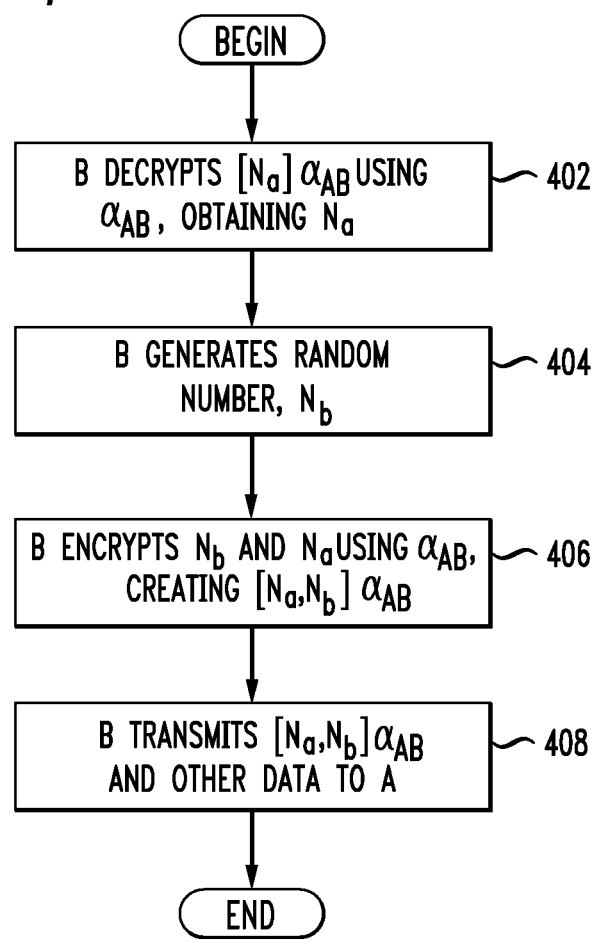
FIG. 4 is a flow diagram of a process of another node, for example, node B, creating and transmitting an encrypted value to another node in the network, such as node A.

FIG. 4 is a flow diagram of a process of another node, for example, node B, creating and transmitting an encrypted value to another node in the network, such as node A. Steps of the methods shown and described need not be performed (and in some implementations are not performed) in the order indicated. Some implementations of these methods may include more or fewer steps than those described. At step 402, node B receives $MK_{AB}(N_a)$ from node A and decrypts the data using the $MK_{AB}$, the same key that was used to encrypt at node A at step 304 of FIG. 3. The decrypted value is temporarily stored in memory at node B. At step 404 node B generates a random number or quasi-random number, $N_b$, analogous to what node A did at step 302 of FIG. 3. At step 406 node B encrypts $N_b$ and $N_a$ using $MK_{AB}$, creating $MK_{AB}(N_a, N_b)$. In another embodiment, B encrypts $N_b$ using $N_a$ and sends that encrypted value, i.e., $N_a(N_b)$. At step 408, node B transmits the encrypted value $MK_{AB}(N_a, N_b)$ and other data to node A. It should be kept in mind that a SAC has not yet been established. Thus, this transmission and other transmissions between nodes A and B are done over other communication channels. In one embodiment, they may be transmitted over a non-secure link and rely solely their being encrypted using $MK_{AB}$ for security.

Figure 5:
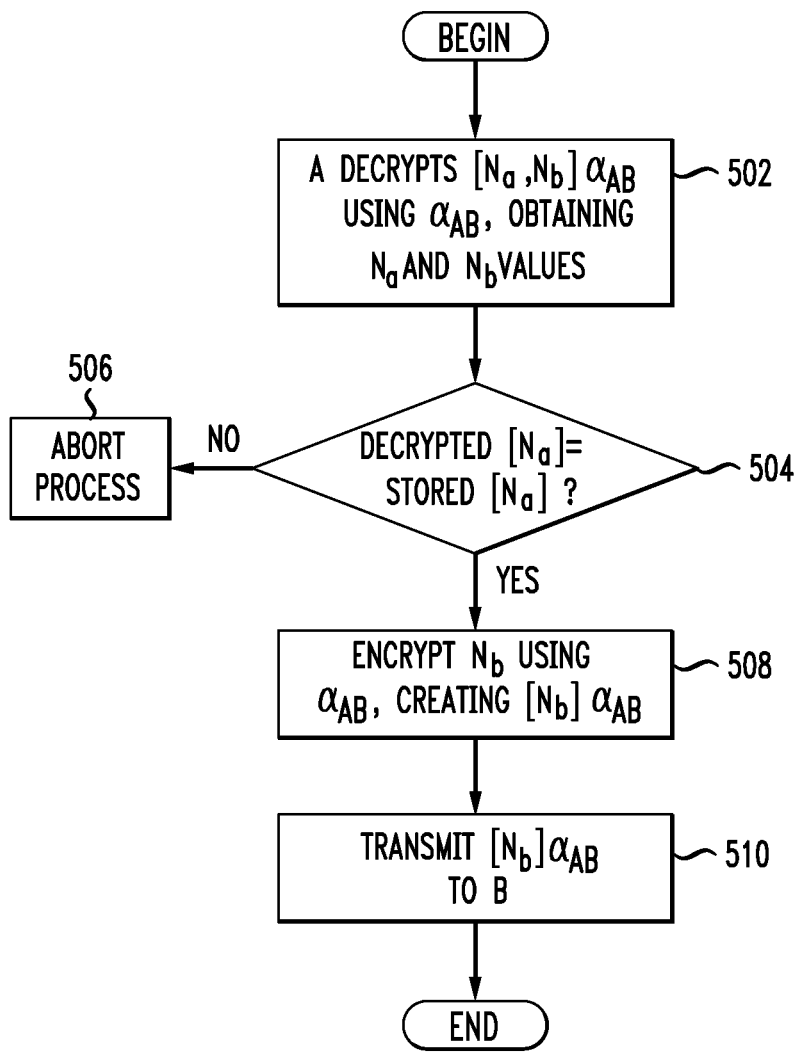
FIG. 5 is a flow diagram of a process of node A authenticating node B's identity.

FIG. 5 is a flow diagram of a process of node A authenticating node B's identity. At step 502 node A decrypts $MK_{AB}(N_a, N_b)$ using $MK_{AB}$ resulting in decrypted values, $N_b$ and $N_a$, the original random values generated by nodes B and A. At step 504 the decrypted value $N_a$ is compared to the stored copy of $N_a$ in node A's memory when it was initially generated. If the values are not the same, the process is aborted at step 506. If they are the same, control goes to step 508. At this stage, node A has effectively authenticated node B's identity and can now trust node B; node A is confident that node B received the same shared secret from the coordinating entity that node A received (i.e., $MK_{AB}$). At step 508 node A encrypts $N_b$ using MK, creating $MK_{AB}(N_b)$. At step 510 this encrypted value is transmitted to node B.

Figure 6:
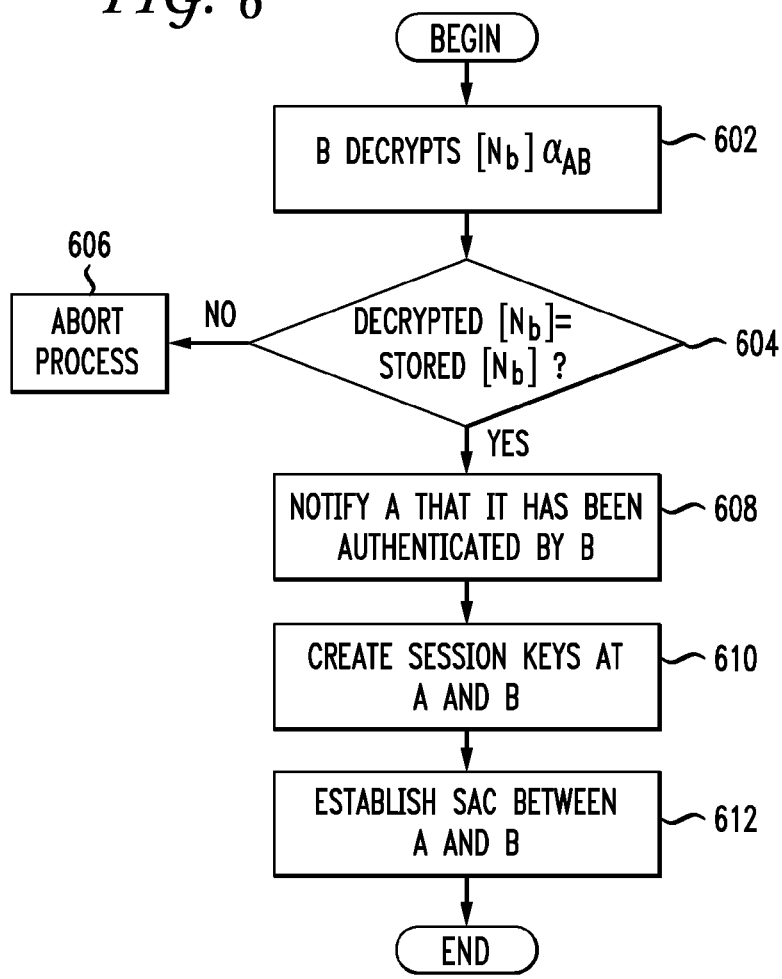
FIG. 6 is a flow diagram of a process of node B authenticating node A's identity.

FIG. 6 is a flow diagram of a process of node B authenticating node A's identity. At step 602 node B decrypts $MK_{ab}(N_b)$ upon receiving it from node A. In one embodiment, by receiving this encrypted value by default, node B knows that A has authenticated B. If it had not received it, then node B knows that node A aborted the process and could not authorize node B. In another embodiment, if node A has authenticated node B's identity, node A may inform node B that it is now trusted. If node A was not able to authenticate node B's identity, node A may transmit an appropriate message to node B.

At step 604 the value of $N_b$ is compared to the value stored by node B when it generated $N_b$ at step 402. If the values are not the same node B has not authorized node A's identity and the process is terminated at step 606. If they are the same, at step 608 node B notifies node A that node A has been authenticated or that there is now mutual authentication. At step 610 session keys are created at node A and node B. Session key derivation functions are described in The Transport Layer Security ("TLS") Protocol Version 1.1 provided in Request for Comment ("RFC") 4346, published April 2006, which provides pseudo-random functions (PRFs) to generate session keys, incorporated by reference herein in its entirety and for all purposes.

At step 612 a SAC has been established between nodes A and B and a confirmation message may be sent between the nodes indicating that a SAC has been established. At this stage the nodes may begin sending data to each other via the SAC.

Figure 7:
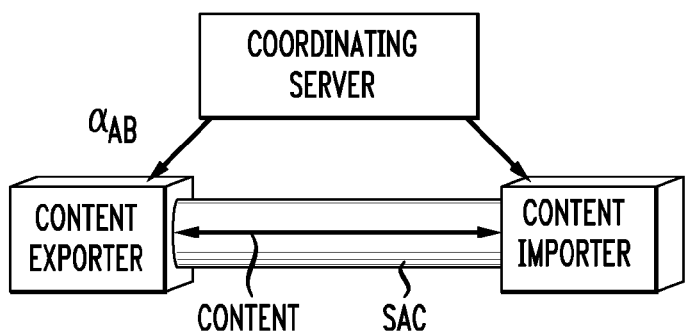
FIG. 7 is an overview network diagram of one context in which SAC establishment is used to transfer content.

FIG. 7 is an overview network diagram of one context in which SAC establishment is used to transfer content. In this embodiment, one node may be a content creator and/or exporter (distributor) and another node may be a content consumer and/or importer. In describing only one illustration out of many, in one context involving digital rights management, the content creator/exporter may be a motion picture studio or a telecommunications company wanting to provide its products or manage the distribution of licensed content over a network to content consumers/importers (e.g., home viewers). In this scenario, a viewer may pay the distributor directly for a movie or music download. The distributor has an interest in ensuring that its licenses content is protected from copying by third parties. This can be done effectively through encryption. It also wants to prevent others from tampering with the encrypted content so that the viewer, who has paid to view the content, can decrypt and view the movie without technical difficulties. This may be done by using a SAC between the distributor and the viewer. The distributor and viewer will also want to authenticate each other's identities which, in one embodiment, is done during the SAC creation process as described above. Another example may be in the music industry where a recording company or music distributor wants to distribute product directly to consumers via the Internet. The recording company and consumers have the same interests as the movie studio and viewer. In another scenario, parties may send data securely using a SAC in a corporate data network.

In one embodiment, the methods and processes described may be implemented as computer program instructions and employed to implement the systems described herein. As such, particular embodiments may relate to machine-readable media that include program instructions, state information, and the like for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. For example, although PKI is used to establish the SACs between the coordinator and nodes A and B in the described embodiments, other standards may also be used in creating these SACs, such as using a shared secret. Accordingly, the embodiments described are to be considered as illustrative and not restrictive, and the invention is not to be limited to the details given herein, but may be modified within the scope and equivalents of the appended claims.

We claim:

1. A method of creating a secure authentication channel in a communication network, the method comprising:
   generating a master key for use only by a first node and a second node, wherein the master key is generated and encrypted by a coordinating entity that sends the master key and a corresponding transfer session identifier to both the first node and the second node;
   encrypting, at the first node, a first random number using the master key, wherein the first random number is stored in a first memory device of the first node, and wherein the first node sends the encrypted first random number and the transfer session identifier to the second node;
   decrypting, at the second node, the encrypted first random number from the first node using the master key and the transfer session identifier to obtain the first random number;
   encrypting, at the second node, a second random number and the first random number using the master key, wherein the second random number is stored in a second memory device of the second node, and wherein the second node sends the encrypted second random number, the encrypted first random number and the transfer session identifier to the first node;
   decrypting, at the first node, the encrypted second random number and the encrypted first random number from the second node using the master key and the transfer session identifier to obtain the first random number and the second random number;
   encrypting, at the first node, the second random number using the master key when the first node determines that the first random number from the second node matches the first random number stored in the first memory device of the first node, wherein the first node sends the encrypted second random number and the transfer session identifier to the second node;
   decrypting, at the second node, the encrypted second random number from the first node using the master key and the transfer session identifier to obtain the second random number; and
   creating a secure authentication channel (SAC) between the first node and the second node in the communication network when the second node determines that the second random number from the first node matches the second random number stored on the second memory device on of the second node.

2. A method as recited in claim 1, further comprising:
   creating a first SAC between the first node and the coordinating entity using public key infrastructure (PKI);
   creating a second SAC between the first node and the coordinating entity using PKI;
   generating the master key specifically for the first node and the second node; and
   transmitting the master key to the first node and the second node.

3. A method as recited in claim 1, further comprising:
   generating the first random number at the first node.

4. A method as recited in claim 1, further comprising:
   generating the second random number at the first node.

5. A method as recited in claim 1, further comprising:
   storing the encrypted first random number at the first node.

6. A method as recited in claim 1, further comprising:
   storing the second random number at the second node.

7. A method as recited in claim 1, further comprising:
   transmitting a notice to the second node that the second node has been authenticated by the first node when the first node determines that the first random number matches the first random number stored in the first memory device of the first node, wherein the notice is transmitted over any suitable channel.

8. A method as recited in claim 1, further comprising:
   transmitting the encrypted first random number to the second node over any suitable channel.

9. A method as recited in claim 1, wherein:
   the first node represents a content creator;
   the second node represents a content consumer; and
   the SAC is created to enforce a digital rights management system.

10. A method as recited in claim 1, further comprising:
    transmitting the encrypted second number and the encrypted first number from the second node to the first node over any suitable channel.

11. A method as recited in claim 1, further comprising:
    encrypting, at the second node, the second random number using the first random number from the first node.

12. A method as recited in claim 1, further comprising:
    generating, at the second node, an encrypted third random number based on the encrypted second random number and the encrypted first random number, wherein the first node sends the encrypted third random number and the transfer session identifier to the first node; and
    decrypting, at the first node, the encrypted third random number from the second number using the master key and transfer session identifier to obtain the first random number and the second random number.

13. A method as recited in claim 12, wherein:
    at least one of the first node and the second node has multiple master keys and utilizes the transfer session identifier to determine which master key to use when decrypting.

14. A network, comprising:
a content creator device;
a content consumer device; and
a coordinating computing device configured for generating and encrypting a master key for use only by the content creator device and the content consumer device during a particular session, wherein the coordinating computing device sends the master key and a corresponding transfer session identifier to the content creator device over a first public key infrastructure (PKI) based secure authentication channel (SAC) between the content creator device and the coordinating computing device, wherein the coordinating computing device sends the master key and the transfer session identifier to the content consumer device over a second PKI based SAC between the content consumer device and the coordinating computing device;
wherein the content creator device is configured for:
  storing the master key and a first random number; and
  encrypting a second random number using the master key; and
wherein the content consumer device is configured for:
  storing the master key and the second random number; and
  decrypting the encrypted second random number from the content creator device using the master key and the transfer session identifier to obtain the second random number, wherein a third SAC between the content creator device and the content consumer device is created when the content consumer device determines that the second random number from the content creator device matches the second random number stored in the content consumer device.

15. A network as recited in claim 14, wherein the third SAC is a hybrid PKI and a shared secret-based SAC created solely for the content creator device and the content consumer device.

16. A network as recited in claim 14, wherein:
the content creator device has a first comparison software module for comparing the first random number stored in the content creator device with a decrypted first random number; and
the content consumer device has a second comparison software module for comparing the second random number stored in the content consumer device with a decrypted second random number.

17. A network as recited in claim 14, wherein:
the content creator device is further configured for:
  encrypting the first random number using the master key, wherein the content creator device sends the encrypted first random number and the transfer session identifier to the content consumer device; and
  decrypting an encrypted first random number and an encrypted second random number from the content consumer device using the master key and the transfer session identifier to obtain the first random number and a second random number; and
the content consumer device is further configured for:
  decrypting the encrypted first random number from the content creator device using the master key and the transfer session identifier to obtain the first random number; and
  encrypting the second random number and the first random number using the master key, wherein the content creator device sends the encrypted second random number, the encrypted first random number and the transfer session identifier to the content creator device.

* * * * *